United States Patent
Lin et al.

(10) Patent No.: US 8,520,374 B2
(45) Date of Patent: Aug. 27, 2013

(54) ELECTRONIC DEVICE WITH AN ADJUSTABLE BOARD STRUCTURE

(75) Inventors: Tung-Hsien Lin, New Taipei (TW); Chia-Lian Yen, New Taipei (TW); Tsai-Yun Sun, New Taipei (TW)

(73) Assignee: Winstron Corporation, Xizhi Dist., New Taipei (TW)

( * ) Notice: Subject to any disclaimer, the term of this patent is extended or adjusted under 35 U.S.C. 154(b) by 81 days.

(21) Appl. No.: 13/400,108

(22) Filed: Feb. 19, 2012

(65) Prior Publication Data

US 2012/0243164 A1 Sep. 27, 2012

(30) Foreign Application Priority Data

Mar. 21, 2011 (TW) ............................. 100109527 A

(51) Int. Cl.
*G06F 1/16* (2006.01)
(52) U.S. Cl.
USPC ............ 361/679.06; 361/679.26; 361/679.27; 361/679.58; 248/917; 248/918; 312/223.1; 312/223.2
(58) Field of Classification Search
USPC ...................................... 361/679.06
See application file for complete search history.

(56) References Cited

U.S. PATENT DOCUMENTS

| | | | |
|---|---|---|---|
| 5,255,214 A * | 10/1993 | Ma ........................ | 361/679.06 |
| 7,203,058 B2 | 4/2007 | Hong | |
| 7,549,246 B2 * | 6/2009 | Kuo ............................... | 40/601 |
| 7,566,033 B2 | 7/2009 | Schwager | |
| 7,903,400 B1 * | 3/2011 | Chen et al. ............... | 361/679.27 |
| 2005/0078444 A1 * | 4/2005 | Hong ........................... | 361/683 |

FOREIGN PATENT DOCUMENTS

| | | |
|---|---|---|
| CN | 100378613 C | 4/2008 |
| TW | M373084 | 1/2010 |

OTHER PUBLICATIONS

Office action mailed on Apr. 15, 2013 for the Taiwan application No. 100109527, filing date: Mar. 21, 2011, p. 2 line 1~26 and line 29~30, p. 3 line 2, line 6~14, line 17~18, line 22~25 and line 28~30 and p. 4 line 1~6, line 9~10, line 14~17, line 20~24 and line 27~32.

* cited by examiner

*Primary Examiner* — Anthony Q Edwards
(74) *Attorney, Agent, or Firm* — Winston Hsu; Scott Margo

(57) ABSTRACT

An electronic device includes a first board structure, a second board structure and a pivoting mechanism. A fixing hole is formed on the first board structure. Two ends of the pivoting mechanism respectively pivot to the first board structure and the second board structure. The electronic device further includes a fixing mechanism installed on the pivoting mechanism. The fixing mechanism includes a base fixed inside the pivoting mechanism, a pin disposed on the base in a slidable manner for inserting into the fixing hole on the first board structure so as to constrain rotation of the first board structure relative to the pivoting mechanism, and a latch disposed on the base in a slidable manner and contacting against the pin for sliding the pin relative to the base.

10 Claims, 10 Drawing Sheets

ELECTRONIC DEVICE WITH AN ADJUSTABLE BOARD STRUCTURE

BACKGROUND OF THE INVENTION

1. Field of the Invention

The disclosure relates to an electronic device with an adjustable board structure, and more particularly, to an electronic device capable of adjusting panel modes according to demand.

2. Description of the Prior Art

Generally, a conventional tablet computer has various operating modes. The conventional tablet computer includes a fixing mechanism for fixing a panel relative to a pivoting shaft, so as to switch the tablet computer in a rotary mode or in a fixing mode. However, an actuating component of the fixing mechanism of the conventional tablet computer is usually disposed on the panel, and an engaging portion is disposed on the pivoting shaft for engaging with the actuating component, so disposal space of the panel of the conventional tablet computer is limited due to a large number of components disposed on the panel.

SUMMARY OF THE INVENTION

The disclosure provides an electronic device with an adjustable board structure for solving above drawbacks.

According to the claimed invention, an electronic device includes a first board structure whereon at least one fixing hole is formed, a second board structure, and a pivoting mechanism. An end of the pivoting mechanism pivots to the first board structure, and the other end of the pivoting mechanism pivots to the second board structure. The electronic device further includes a fixing mechanism installed on the pivoting mechanism. The fixing mechanism includes a base fixed inside the pivoting mechanism, a pin disposed on the base in a slidable manner for inserting into the fixing hole on the first board structure so as to constrain rotation of the first board structure relative to the pivoting mechanism, and a latch disposed on the base in a slidable manner and contacting against the pin for sliding the pin relative to the base.

According to the claimed invention, the fixing mechanism further includes a button disposed on the latch for driving the latch to slide the pin relative to the base as being pushed.

According to the claimed invention, the fixing mechanism further includes a tenon disposed on the latch for engaging with an engaging portion of the base for preventing the latch from sliding relative to the base.

According to the claimed invention, the tenon is a resilient protrusion, and the engaging portion of the base is a rib structure.

According to the claimed invention, the fixing mechanism further includes a resilient component disposed between the pin and the base for separating the pin from the fixing hole on the first board structure, so as to release constrain of the rotation of the first board structure relative to the pivoting mechanism.

According to the claimed invention, the resilient component sheathes on the pin.

According to the claimed invention, the latch is for inserting the pin into the fixing hole on the first board structure, so as to compress the resilient component.

According to the claimed invention, the fixing mechanism further includes a resilient component disposed between the latch and the base for driving the latch to insert the pin into the fixing hole on the first board structure, so as to prevent the first board structure from pivoting relative to the pivoting mechanism.

According to the claimed invention, the latch is for separating the pin from the fixing hole on the first board structure, so as to compress the resilient component.

According to the claimed invention, the first board structure is a first screen, and the second board structure is a host or a second screen.

The electronic device of the disclosure disposes the fixing mechanism inside the pivoting mechanism, so that the first board structure (such as the screen) can have sufficient space for containing a large size panel. In addition, the disclosure has advantages of simple mechanical design and easy operation, so as to decrease manufacturing cost and to increase operating convenience of the electronic device.

These and other objectives of the disclosure will no doubt become obvious to those of ordinary skill in the art after reading the following detailed description of the embodiment that is illustrated in the various figures and drawings.

DETAILED DESCRIPTION

Figure 1:
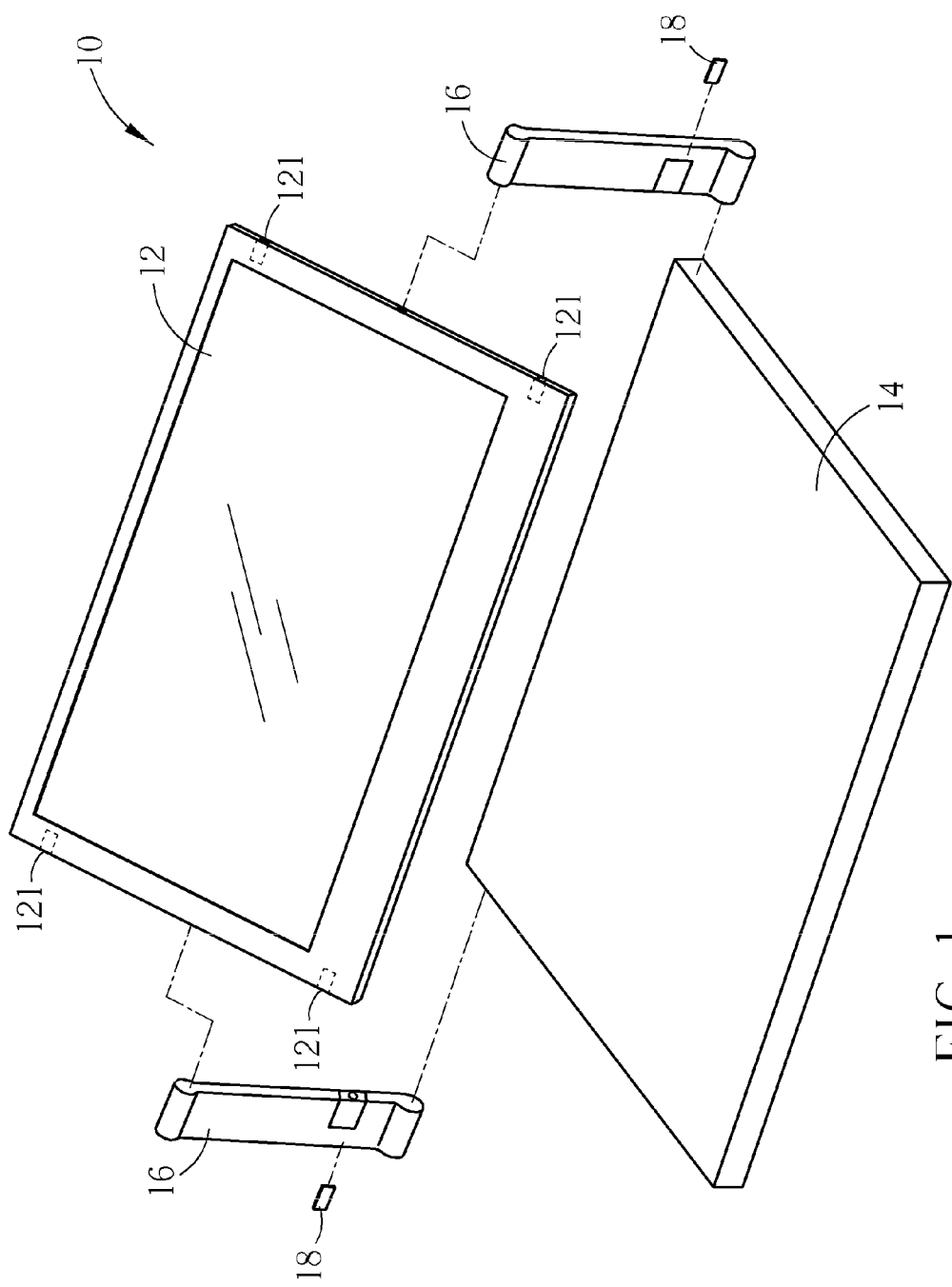
FIG. 1 is an exploded diagram of an electronic device according to an embodiment of the disclosure.
Figure 2:
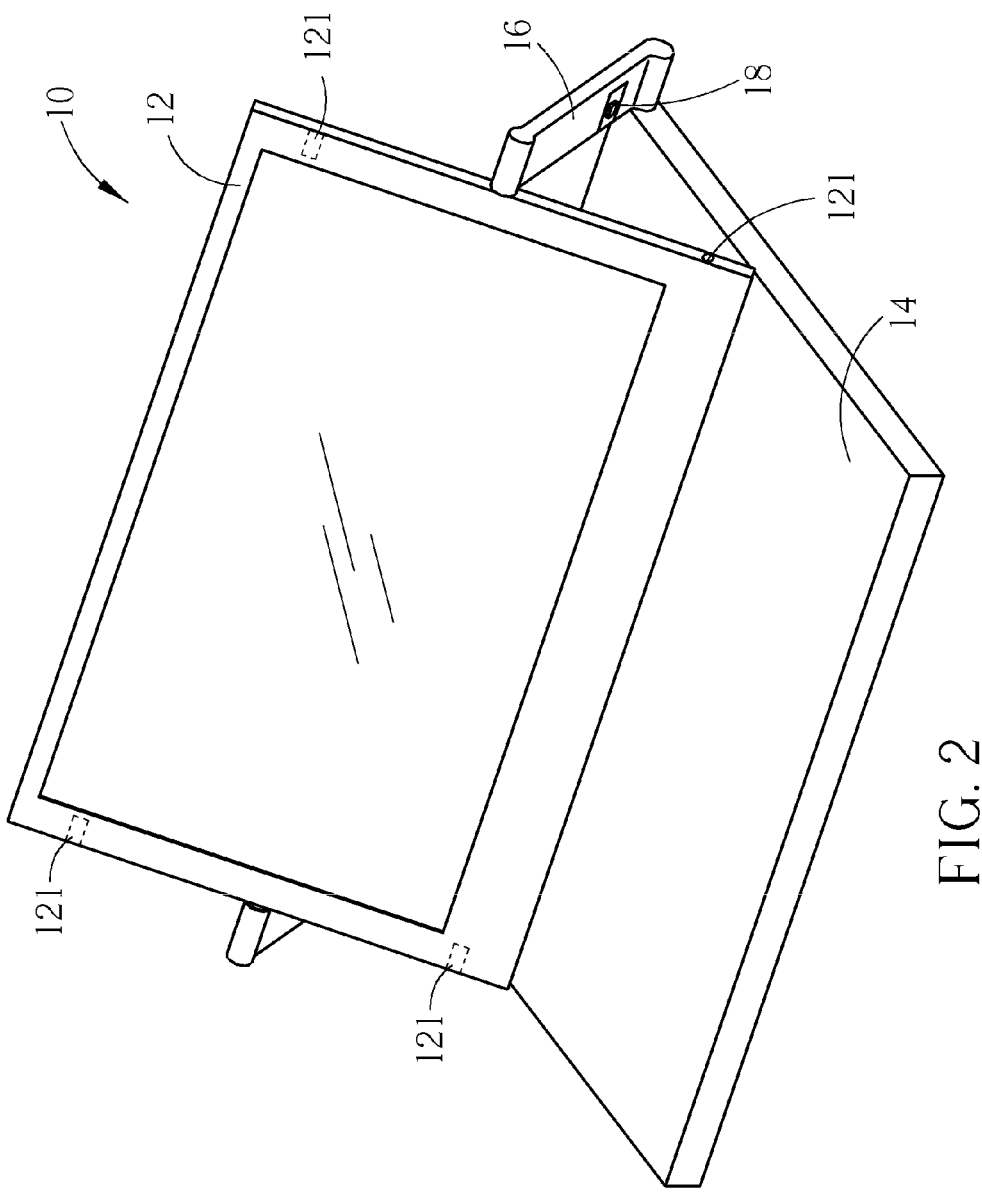
FIG. 2 is an assembly diagram of the electronic device according to the embodiment of the disclosure.

Please refer to FIG. 1 and FIG. 2. FIG. 1 is an exploded diagram of an electronic device 10 according to an embodiment of the disclosure. FIG. 2 is an assembly diagram of the electronic device 10 according to the embodiment of the disclosure. The electronic device 10 includes a first board structure 12 whereon at least one fixing hole 121 is formed, a second board structure 14 and a pivoting mechanism 16. In the embodiment of the disclosure, the first board structure 12 can be a screen, and the second board structure 14 can be a host. An end of the pivoting mechanism 16 pivots adjacent to a middle of the first board structure 12, and the other end of the pivoting mechanism 16 pivots to a side of the second board structure 14. Therefore, the first board structure 12 can pivot relative to the pivoting mechanism 16 within a range between 0 degree and 360 degrees, and the second board structure 14 can pivot relative to the pivoting mechanism 16 within a range between 0 degree and 180 degrees. In addition, the electronic device 10 further includes a fixing mechanism 18 installed on the pivoting mechanism 16 for constraining rotation of the first board structure 12 relative to the pivoting mechanism 16, so as to position an angle of view of the first board structure 12 according to demand.

Figure 3A:
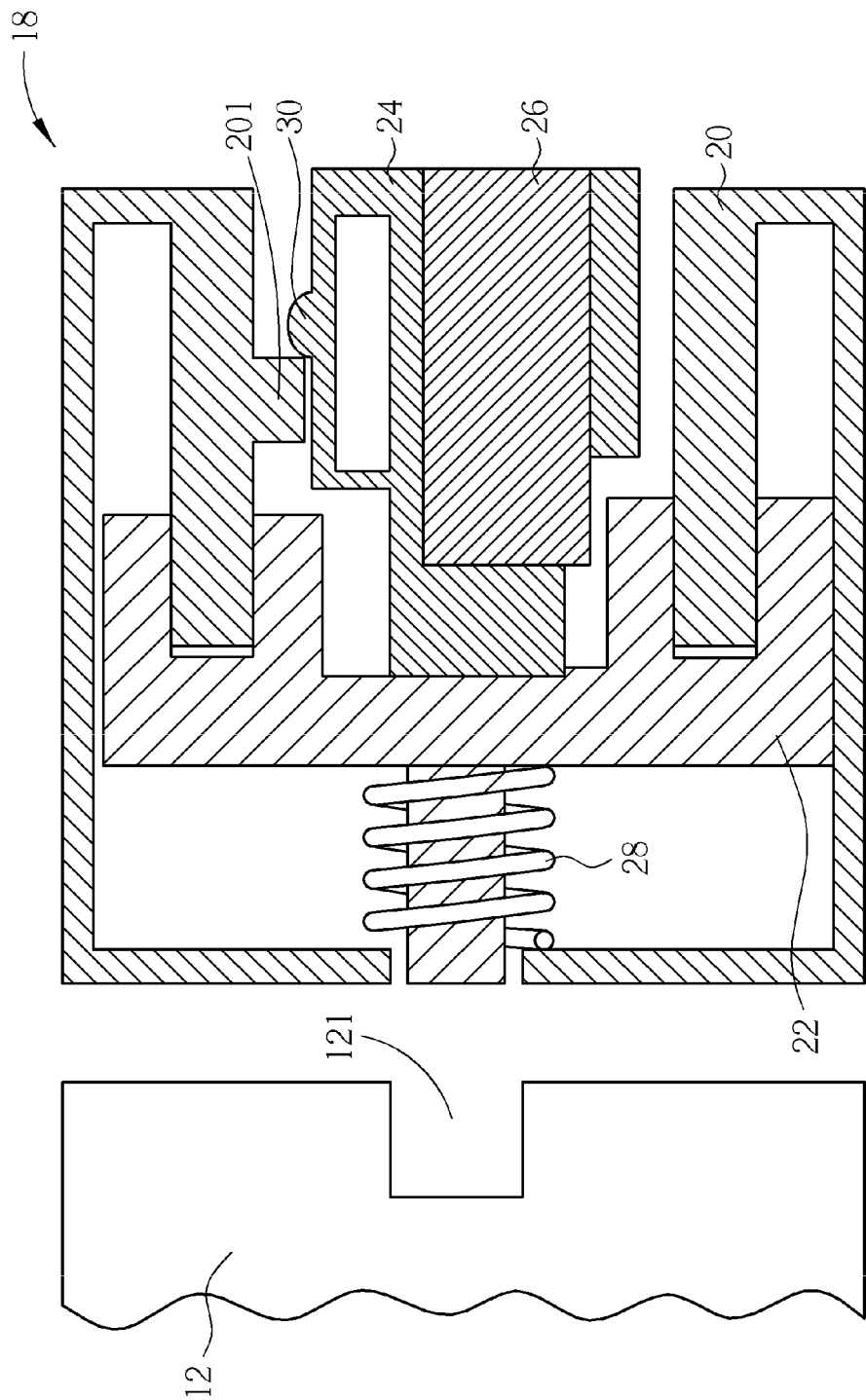
FIG. 3A and FIG. 3B are diagrams of a fixing mechanism in different operating modes according to a first embodiment of the disclosure.
Figure 3B:
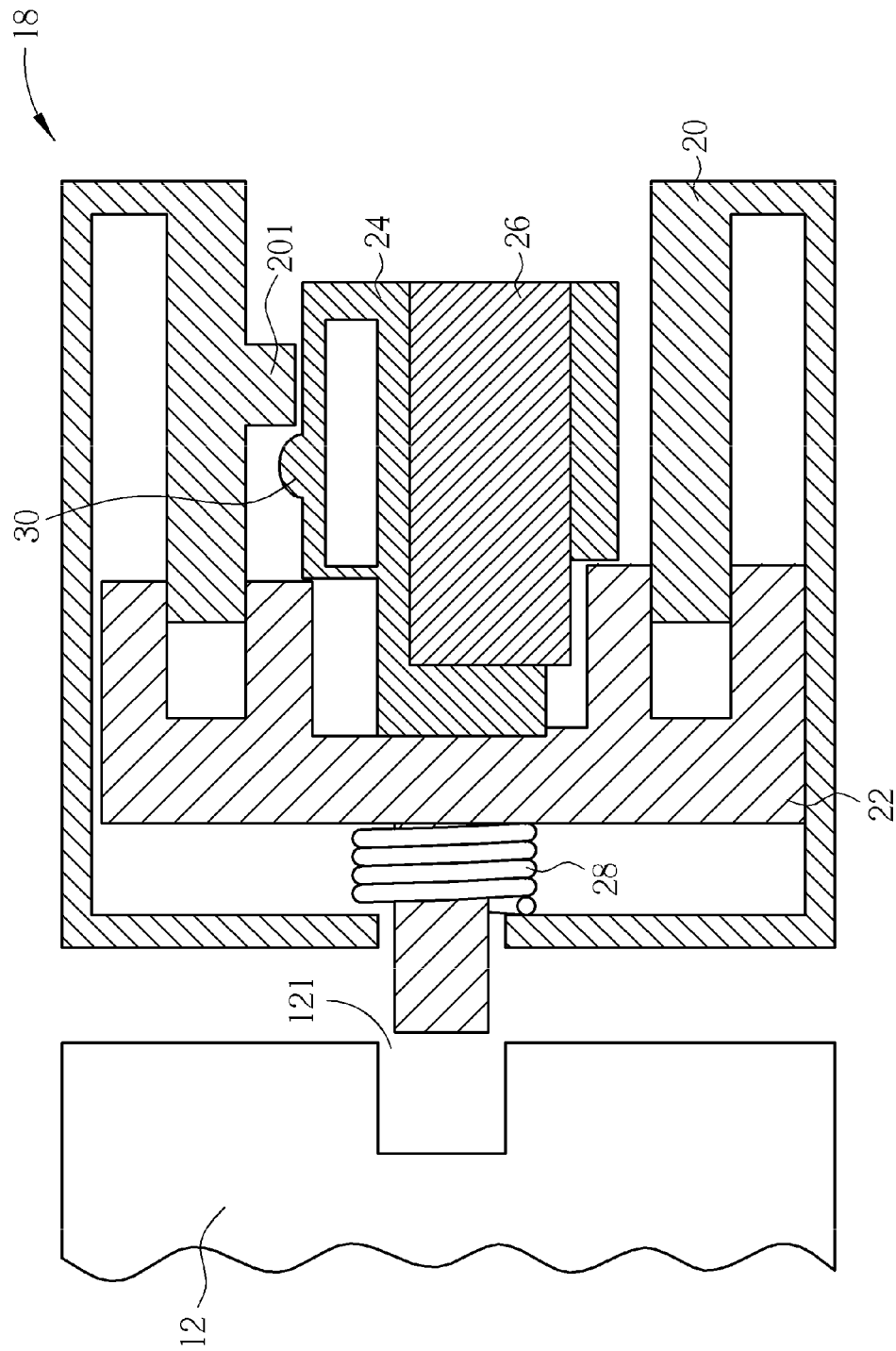

Please refer to FIG. 3A and FIG. 3B. FIG. 3A and FIG. 3B are diagrams of the fixing mechanism 18 in different operating modes according to a first embodiment of the disclosure. The fixing mechanism 18 includes a base 20 fixed inside the pivoting mechanism 16, and a pin 22 disposed on the base 20 in a slidable manner for inserting into the fixing hole 121 on the first board structure 12, so as to constrain the rotation of the first board structure 12 relative to the pivoting mechanism 16. In the first embodiment, the pin 22 can be made of metal material or plastic material having sufficient strength, so as to bear shearing stress generated from the first board structure 12 when pivoting relative to the pivoting mechanism 16. The fixing mechanism 18 further includes a latch 24 disposed on the base 20 in a slidable manner and contacting against the pin 22 for sliding the pin 22 relative to the base 20, a button 26 disposed on the latch 24, and a resilient component 28 disposed between the pin 22 and the base 20. The resilient component 28 can contact against the base 20 and sheath on the pin 22.

In the first embodiment, the fixing mechanism 18 can be switched between a releasing mode and a constraining mode. When the button 26 is pushed, the latch 24 slides the pin 22 relative to the base 20 by the button 26, so that the pin 22 is inserted into the fixing hole 121 on the first board structure 12. Meanwhile, the resilient component 28 is compressed for storing a resilient recovering force, and the first board structure 12 can not pivot relative to the pivoting mechanism 16. When the button 26 is released, the resilient recovering force of the resilient component 28 can be for pushing the pin 22 out of the fixing hole 121 on the first board structure 12, so as to release the constrain of the first board structure 12 relative to the pivoting mechanism 16. Thus, the fixing mechanism 18 can further include a tenon 30 disposed on the latch 24. The tenon 30 can be engaged with an engaging portion 201 of the base 20. An engagement of the tenon 30 and the engaging portion 201 can resist the resilient recovering force of the resilient component 28 when the pins 22 stops sliding relative to the base 20, so as to prevent the latch 24 from sliding relative to the base 20. The tenon 30 can be a resilient protrusion, and the engaging portion 201 of the base 20 can be a rib structure. That is to say, in the first embodiment of the disclosure, an initial position of the pin 22 is located inside the base 20 when the button 26 is not pushed. The pin 22 is pushed outwardly for inserting into the fixing hole 121 on the first board structure 12 when the button 26 is pushed.

Figure 4A:
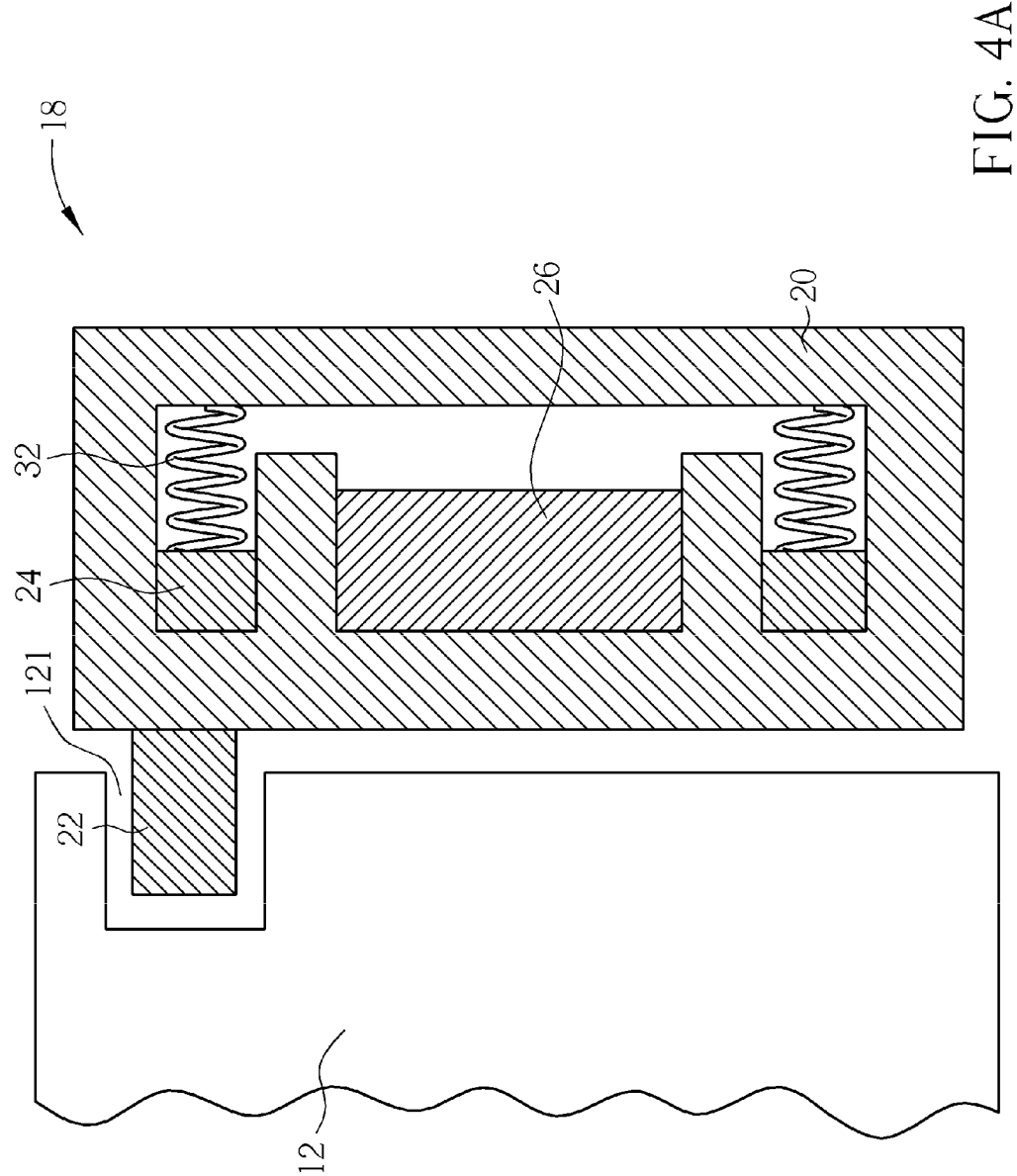
FIG. 4A and FIG. 4B are diagrams of the fixing mechanism in different operating modes according to a second embodiment of the disclosure.
Figure 4B:
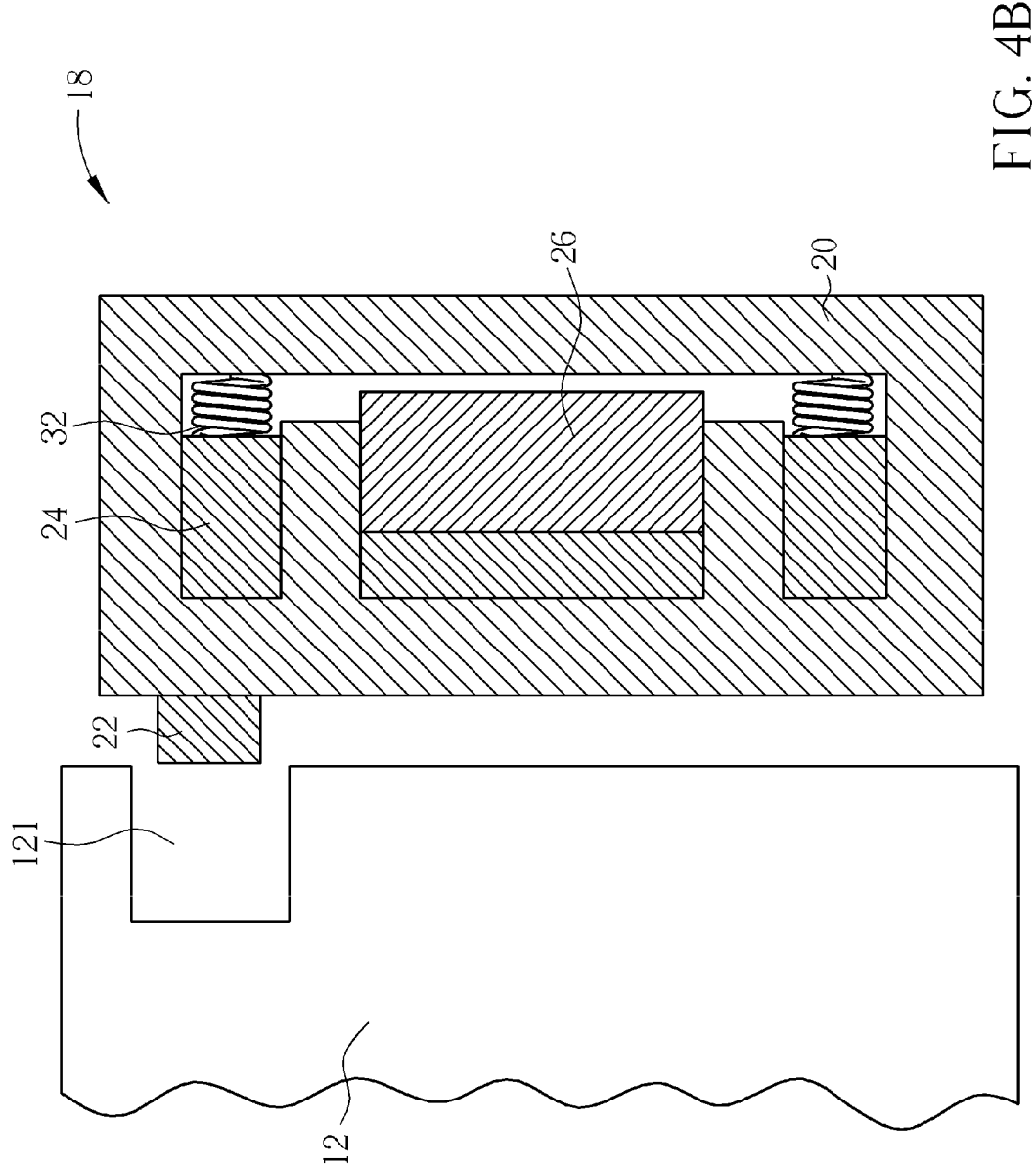

The fixing mechanism 18 can be implemented as at least two types. Please refer to FIG. 4A and FIG. 4B. FIG. 4A and FIG. 4B are diagrams of the fixing mechanism 18 in different operating modes according to a second embodiment of the disclosure. The fixing mechanism 18 of the second embodiment includes the base 20, the pin 22, the latch 24, the button 26 and a resilient component 32. In this embodiment, elements having the same numerals as ones of the above-mentioned embodiment have the same structures and function, and detailed description is omitted herein for simplicity. Difference between the first embodiment and the second embodiment is that the resilient component 32 is disposed between the latch 24 and the base 20 for driving the latch 24 to insert the pin 22 into the fixing hole 121 on the first board structure 12, so as to prevent the first board structure 12 from pivoting relative to the pivoting mechanism 16. The button 26 can be pushed for sliding the latch 24 relative to the base 20, so as to move the pin 26 out of the fixing hole 121 on the first board structure 12 to unlock the fixing mechanism 18. Meanwhile, the resilient component 32 is compressed, and the resilient recovering force of the resilient component 32 can be for ejecting the pin 22 from the base 20 when the button 26 is not pushed.

The fixing mechanism 18 of the second embodiment does not constrain the latch 24 to slide relative to the base 20. When the pin 26 separates from the fixing hole 121, the first board structure 12 can pivot relative to the pivoting mechanism 16, so as to misalign the fixing hole 121 on the first board structure 12 with the pin 26. Thus, the pin 26 is not inserted into the fixing hole 121 when the button 26 is not pushed and the pin 26 is ejected from the pivoting mechanism 16 by the resilient recovering force of the resilient component 32, so that the first board structure 12 can pivot relative to the pivoting mechanism 16 without constrain. In the second embodiment of the disclosure, the initial position of the pin 22 is protruding out of the base 20. The button 26 is pushed for moving the pin 22 out of the fixing hole 121 on the first board structure 12. The condition type of the fixing mechanism 18 is not limited to the above-mentioned embodiment, and relates to design demand.

Figure 5:
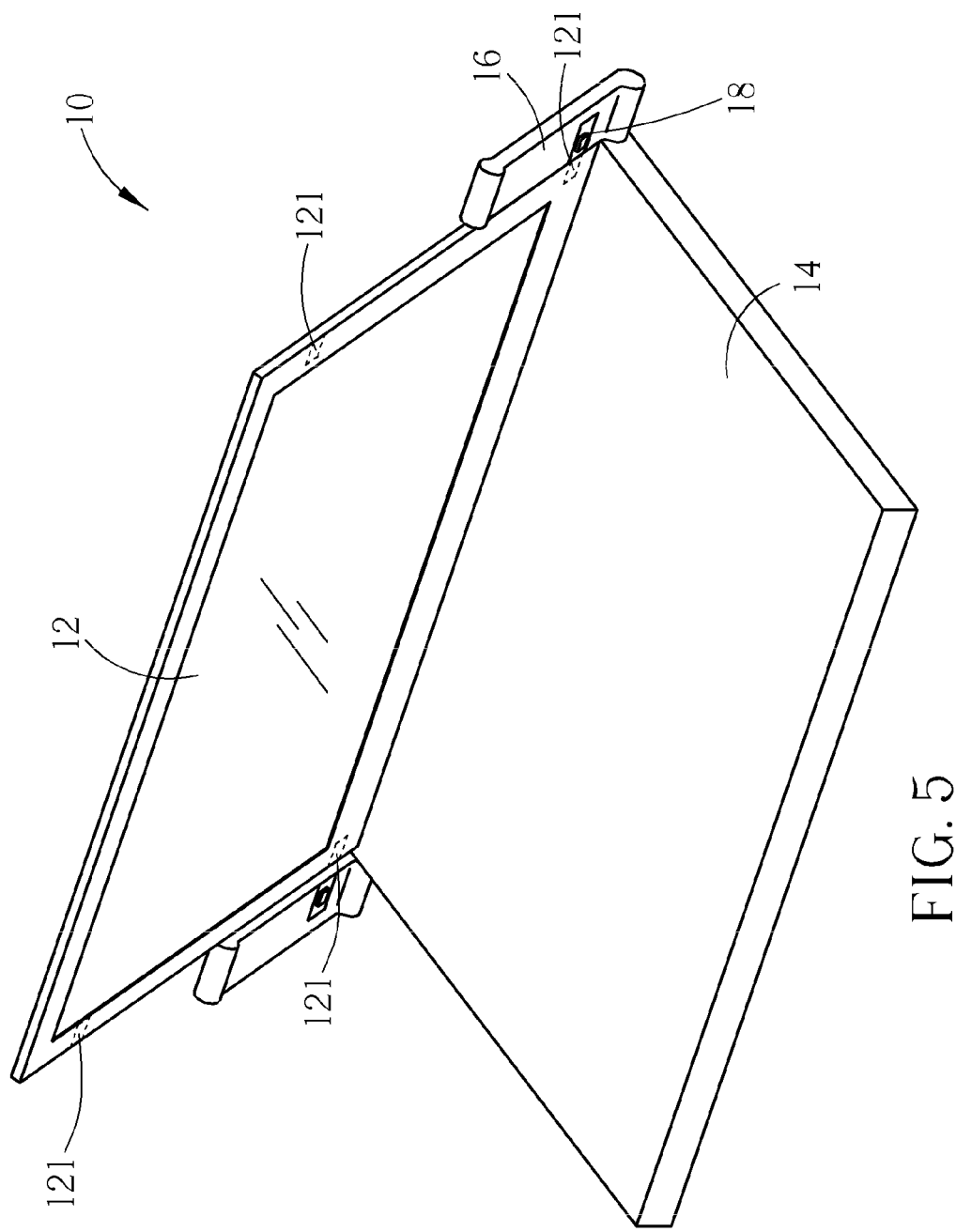
FIG. 5 to FIG. 8 are diagrams of the electronic device in different operating modes according to the embodiment of the disclosure.
Figure 6:
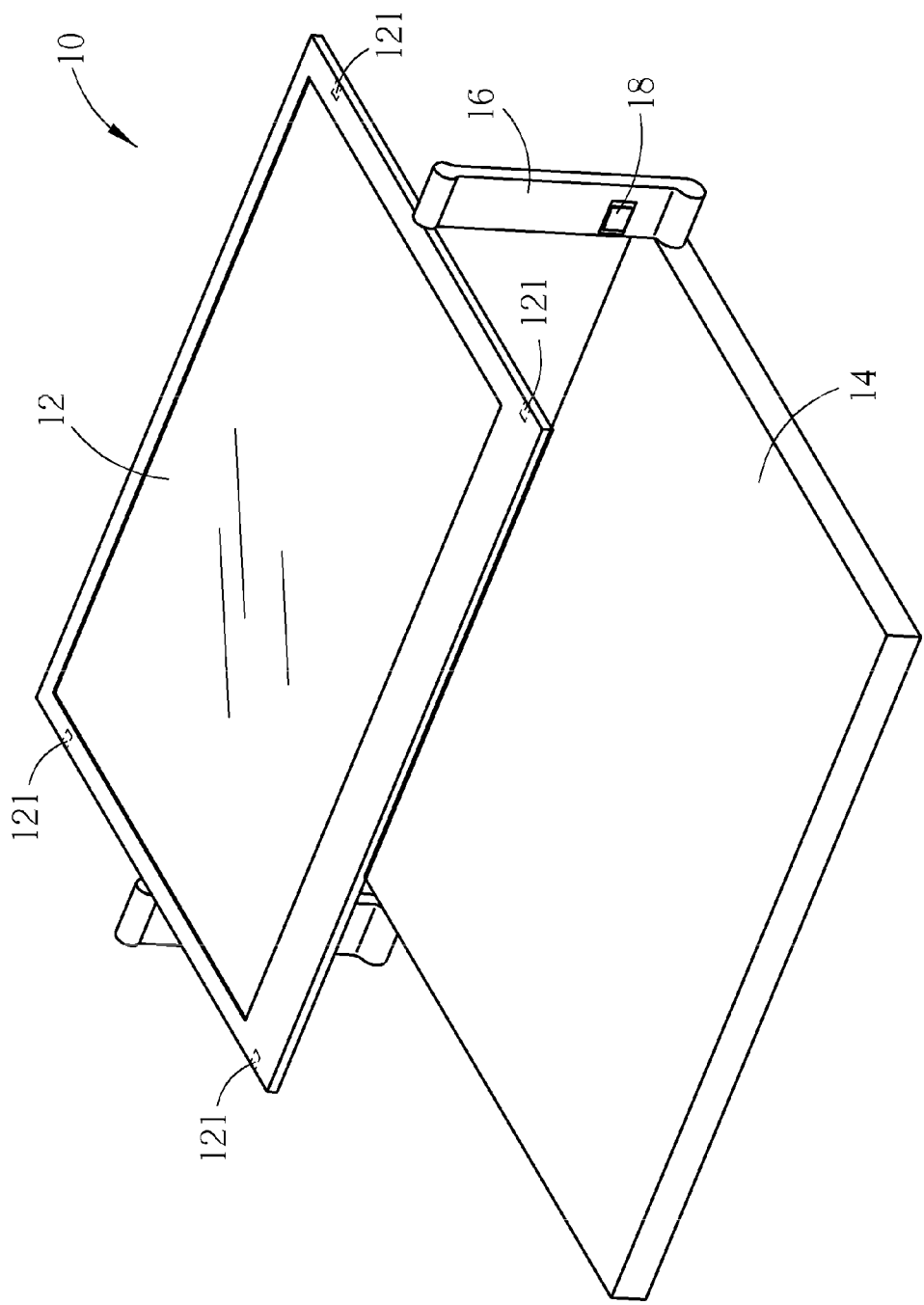
Figure 7:
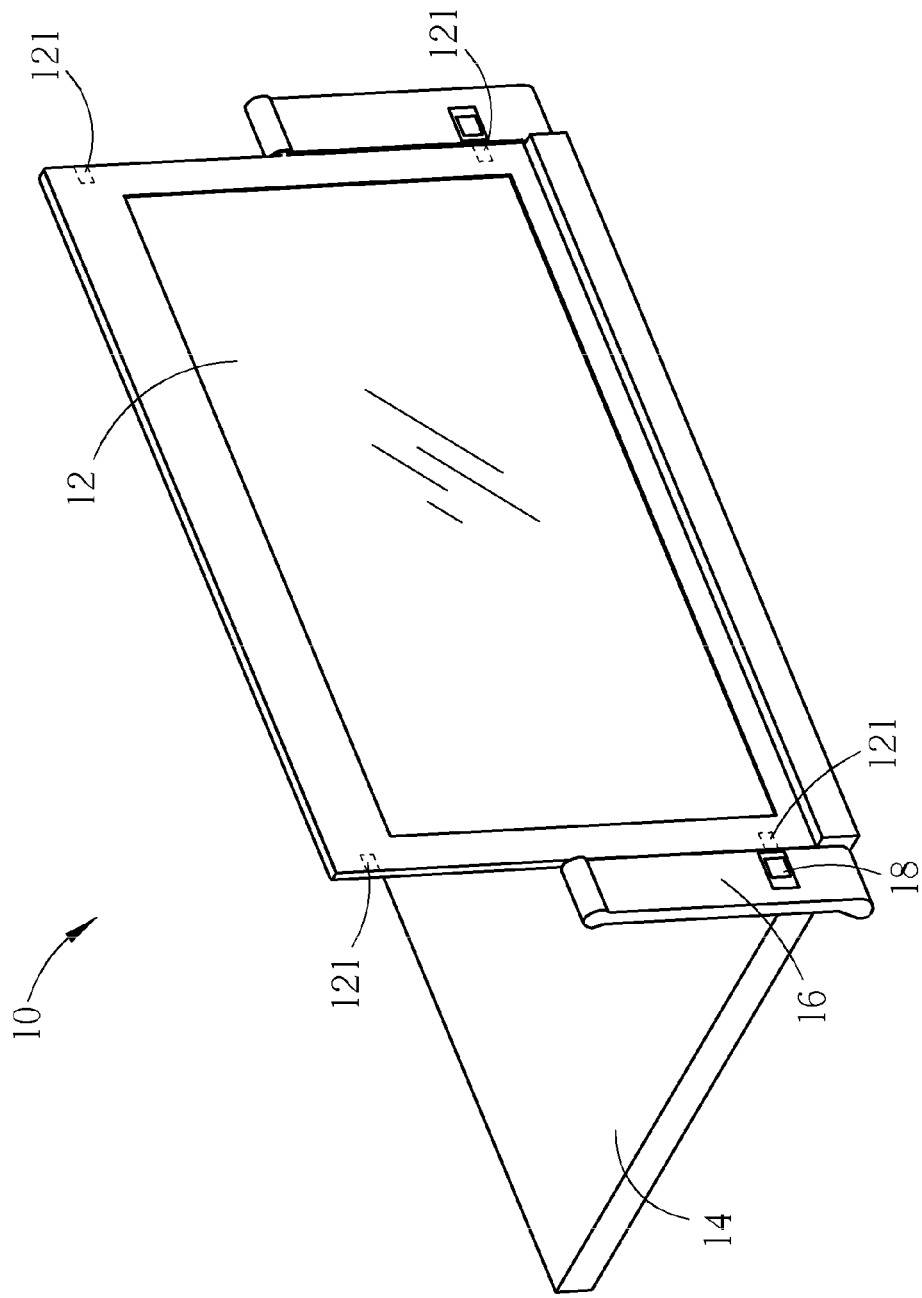
Figure 8:
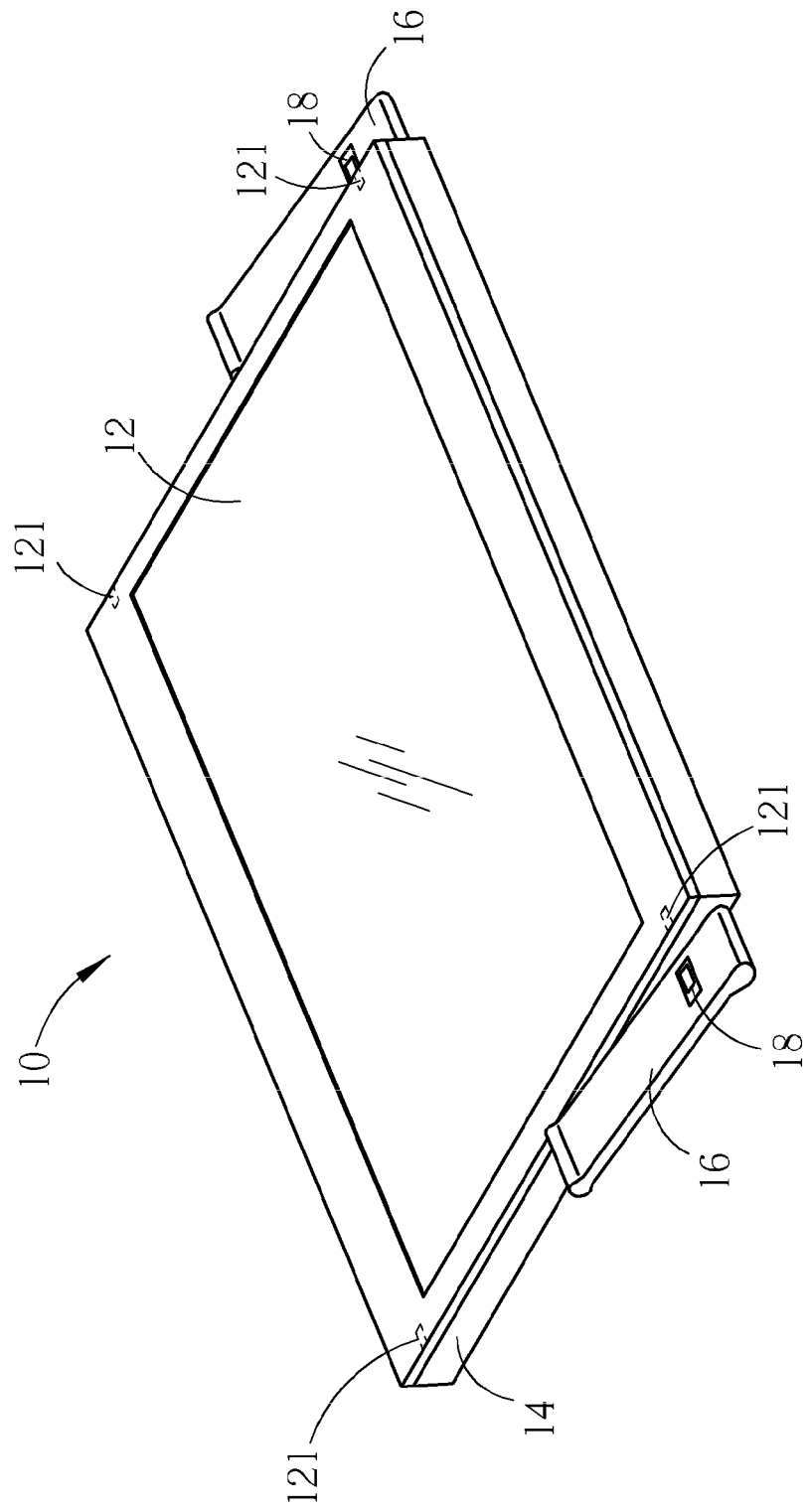

Please refer to FIG. 5, FIG. 6, FIG. 7 and FIG. 8. FIG. 5 to FIG. 8 are diagrams of the electronic device 10 in different operating modes according to the embodiment of the disclosure. In the embodiment of the disclosure, the first board structure 12 can be the screen, and the second board structure 14 can be the host. However, the disclosure is not limited to the above embodiment, for example, the second board structure 14 can be another screen. As shown in FIG. 5, the first board structure 12 of the electronic device 10 is fixed on the pivoting mechanism 16, the first board structure 12 and the pivoting mechanism 16 can pivot relative to the second board structure 14 synchronously, and the electronic device 10 can act as a notebook computer. As shown in FIG. 6, the fixing mechanism 18 can be for releasing the constrain of the first board structure 12 relative to the pivoting mechanism 16, so that the first board structure 12 can pivot relative to the pivoting mechanism 16 within the range between 0 degree and 360 degrees. As shown in FIG. 7, the first board structure 12 is fixed on the pivoting mechanism 16 by the fixing mechanism 18 when the first board structure 18 pivots from a position shown in FIG. 5 to 180 degrees for reverse rotation. Meanwhile, the first board structure 12 and the pivoting mechanism 16 can pivot relative to the second board structure 14 synchronously, so that a view angle of the first board structure 12 shown in FIG. 7 is inverse with respect to the view angle of the first board structure 12 shown in FIG. 5. For example, the electronic device 10 can act as a tablet computer shown in FIG. 8 when the first board structure 12 is close to the second board structure 14.

Comparing to the prior art, the electronic device of the disclosure disposes the fixing mechanism inside the pivoting mechanism, so that the first board structure (such as the screen) can have sufficient space for containing a large size panel. In addition, the disclosure has advantages of simple mechanical design and easy operation, so as to decrease manufacturing cost and to increase operating convenience of the electronic device.

Those skilled in the art will readily observe that numerous modifications and alterations of the device and method may be made while retaining the teachings of the invention.

What is claimed is:

1. An electronic device comprising:
   a first board structure whereon at least one fixing hole is formed;
   a second board structure;
   a pivoting mechanism, an end of the pivoting mechanism pivoting to the first board structure, and the other end of the pivoting mechanism pivoting to the second board structure; and
   a fixing mechanism installed on the pivoting mechanism, the fixing mechanism comprising:
   a base fixed inside the pivoting mechanism;
   a pin disposed on the base in a slidable manner for inserting into the fixing hole on the first board structure so as to constrain rotation of the first board structure relative to the pivoting mechanism; and a latch disposed on the base in a slidable manner and contacting against the pin for sliding the pin relative to the base.

2. The electronic device of claim 1, wherein the fixing mechanism further comprises:
a button disposed on the latch for driving the latch to slide the pin relative to the base as being pushed.

3. The electronic device of claim 1, wherein the fixing mechanism further comprises:
a tenon disposed on the latch for engaging with an engaging portion of the base for preventing the latch from sliding relative to the base.

4. The electronic device of claim 3, wherein the tenon is a resilient protrusion, and the engaging portion of the base is a rib structure.

5. The electronic device of claim 1, wherein the fixing mechanism further comprises:
a resilient component disposed between the pin and the base for separating the pin from the fixing hole on the first board structure, so as to release constrain of the rotation of the first board structure relative to the pivoting mechanism.

6. The electronic device of claim 5, wherein the resilient component sheathes on the pin.

7. The electronic device of claim 5, wherein the latch is for inserting the pin into the fixing hole on the first board structure, so as to compress the resilient component.

8. The electronic device of claim 1, wherein the fixing mechanism further comprises:
a resilient component disposed between the latch and the base for driving the latch to insert the pin into the fixing hole on the first board structure, so as to prevent the first board structure from pivoting relative to the pivoting mechanism.

9. The electronic device of claim 8, wherein the latch is for separating the pin from the fixing hole on the first board structure, so as to compress the resilient component.

10. The electronic device of claim 1, wherein the first board structure is a first screen, and the second board structure is a host or a second screen.

* * * * *

UNITED STATES PATENT AND TRADEMARK OFFICE
CERTIFICATE OF CORRECTION

| | | |
|---|---|---|
| PATENT NO. | : 8,520,374 B2 | Page 1 of 1 |
| APPLICATION NO. | : 13/400108 | |
| DATED | : August 27, 2013 | |
| INVENTOR(S) | : Tung-Hsien Lin et al. | |

It is certified that error appears in the above-identified patent and that said Letters Patent is hereby corrected as shown below:

On the title page, item (73), correct the name of the assignee from "Winstron Corporation" to --Wistron Corporation--.

Signed and Sealed this
Fifth Day of November, 2013

Teresa Stanek Rea
*Deputy Director of the United States Patent and Trademark Office*